June 30, 1925.

V. W. THOMSON

CAN

Filed April 19, 1924

1,544,503

WITNESSES
Chr. Nielsen,

INVENTOR
V. W. Thomson,

BY

ATTORNEYS

Patented June 30, 1925.

1,544,503

UNITED STATES PATENT OFFICE.

VOLNEY WAYNE THOMSON, OF EL PASO, TEXAS.

CAN.

Application filed April 19, 1924. Serial No. 707,754.

*To all whom it may concern:*

Be it known that I, VOLNEY WAYNE THOMSON, a citizen of the United States, residing at El Paso, in the county of El Paso, State of Texas, have invented certain new and useful Improvements in Cans, of which the following is a specification.

My invention relates to improvements in containers for the reception of liquid, more particularly to containers which are of suitable size to be carried manually from place to place or moved about, and it consists in the combinations, constructions, and arrangements herein described and claimed.

An object of the invention is to improve the construction of a container of the character described by providing the container with an elongated discharge member which is adapted to be attached to the container at its normally free end and which then is adapted to serve as a handle for the container.

A further object of the invention is to provide a container of the character described which is adapted to hold a liquid therein without possibility of the liquid being spilled therefrom accidentally and which at the same time affords facilities whereby the liquid contents thereof may be discharged quickly at a desired place without any wastage.

A still further object of the invention is to provide a container of the character described which is of simple construction and which is thoroughly practical commercially.

Figure 1:
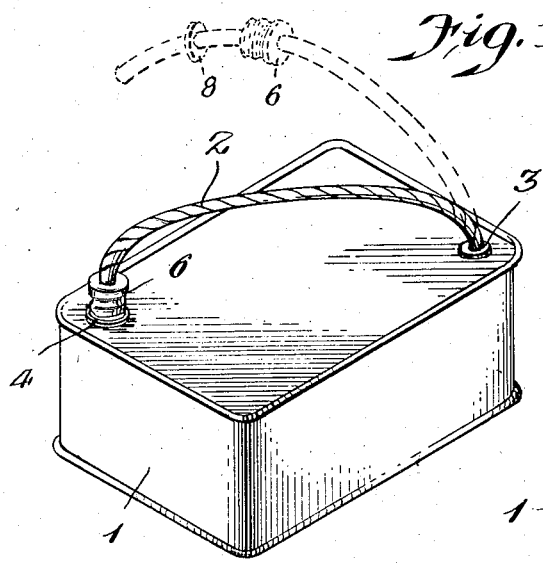
Figure 2:
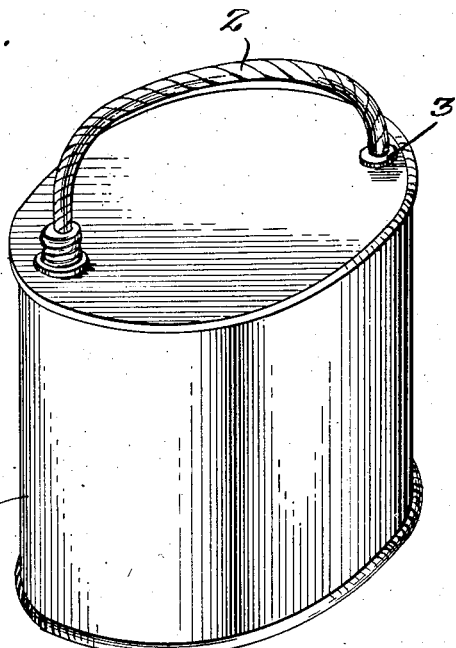
Figure 4:
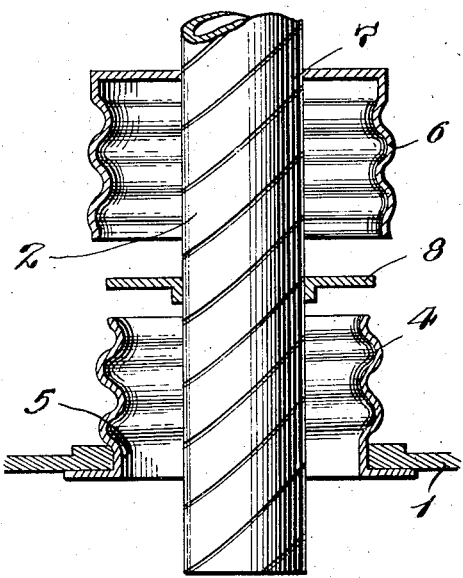
Figure 3:
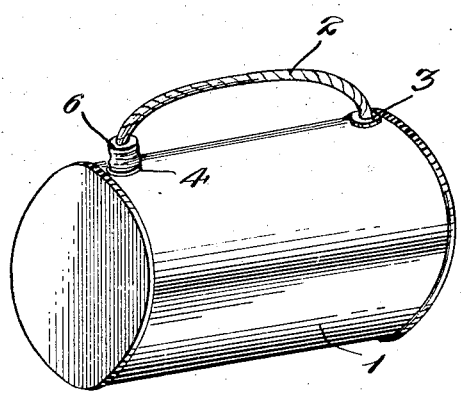

Other objects and advantages of the invention will be apparent from the following description considered in conjunction with the accompanying drawings, in which:

Figure 1 is a perspective view of a container which embodies the invention,

Figure 2 is a perspective view of a container embodying the invention in a slightly different form than that which is exhibited in Figure 1, Figure 3 is a perspective view of a container embodying the invention and of slightly different form than the containers exhibited in Figures 1 and 2, and Figure 4 is a fragmentary view showing a portion of the container exhibited in Figure 1 in vertical section and a portion of the discharge member of the container in side elevation.

In carrying out my invention, I make use of a container which is of suitable size to be carried from place to place and which is adapted for the reception of any one of various liquid commodities. The container may be of any desired or preferred shape or size and may be substantially rectangular in horizontal sectional contour as is the container indicated at 1 in Figure 1, substantially oblong in horizontal sectional contour as is the container shown in Figure 2 and also indicated at 1 or substantially circular in vertical sectional contour as is the container exhibited in Figure 3 and also indicated at 1. The container is provided with a flexible elongated tubular discharge member 2 which is secured at one end to a normally upper part of the container adjacent to one marginal edge of the normally upper part of the container, as indicated at 3 in Figures 1, 2 and 3 of the drawing. The connection of the discharge member 2 with the container at 3 may be permanent or may permit of the complete detachment of the discharge member from the container. A liquid tight connection is provided at 3 in any event and the discharge member 2 is in open communication at its said one end with the interior of the container.

The container also is provided in the aforesaid normally upper part thereof with a tubular inlet or nipple 4 which is located at appreciable distance from the connection at 3 and preferably adjacent to the marginal edge portion of the upper part of the container opposite to the marginal edge portion that is adjacent to the connection at 3. The nipple or tubular member 4 may be an integral part of the upper wall of the container or may be a separate member secured at its inner end in an opening 5 in said upper part of the container as shown in Figure 4.

The flexible discharge member 2 is of sufficient length to permit of its being moved from discharging position as indicated by the dotted lines in Fig. 1 to inactive or non-discharging position in which the normally free end of the discharge member is received in the tubular member 4 as best seen in Fig. 4. A cap 6 is provided with a central opening at 7 through which the discharge member 2 extends whereby the cap 6 is slidable on the discharge member and may be moved along the latter to and from position to engage with the tubular member 4. The cap 6 and the tubular member 4 are adapted to be connected together detachably as by being provided with co-operative screw threads as clearly shown in Fig. 4. A packing washer 8 is secured on the flexible discharge member 2 adjacent to the normally free end of the latter and is of sufficient diameter to abut the outer end of the tubular member 4, when the normally free end of the discharge member 2 is inserted in the tubular member 4 slightly beyond the position shown in Fig. 4. When the cap 6 has been slid on the discharge member 2 against the tubular member 4 and has been screwed tight on the latter, the packing washer 8 will be clamped securely against the outer end of the tubular member 4, and will prevent leakage between the tubular member 4 and the discharge member 2.

From the foregoing description of the various parts of the device, the operation thereof may be readily understood. When the discharge member 2 is in active or discharging position as indicated by the dotted lines in Figure 1, the upturning or tilting of the container will result in the discharge of liquid from the container through the discharge member.

When the discharge member is secured at its normally free end to the tubular member 4 and is in non-discharging position, as indicated by the full lines in Figure 1, and as indicated in Figures 2 and 3, the discharge member is adapted to be grasped and serves as a handle for the container, whereby the container can be conveniently moved from place to place. The tubular member 4 may be used as a filler neck for the container and also obviates the necessity of perforating the upper part of the container to provide an air vent at the time it is desired to effect the discharge of the contents of the container therefrom, as is ordinarily necessary in the case of sealed containers.

Obviously, the invention is susceptible of embodiment in forms other than that exhibited in the accompanying drawings, and I, therefore, consider as my own all such modifications and adaptations thereof as fairly fall within the scope of the appended claims.

I claim:

1. A container for the reception of liquids, a flexible tubular discharge member therefor, said flexible tubular discharge member being secured at one end to said container and said discharge member in said container being provided with co-operative fastening elements whereby said discharge member may be releasably secured at its other end to said container, said discharge member and the means whereby it is secured to the container being of sufficient strength to sustain the weight of the container and the contents thereof without appreciable strain.

2. In combination, a container, a flexible elongated discharge member secured at one end to a normally upper part of the container, a nipple extending from the normally upper part of the container in spaced relation to the junction of the container and the discharge member, said discharge member being of sufficient length to permit of the insertion of the normally free end thereof in the nipple, a cap slidable on the discharge member and threadedly engageable with the nipple, and a packing washer carried by said discharge member in position to be clamped by said cap against said nipple when the cap is engaged with the nipple.

VOLNEY WAYNE THOMSON.